US011947677B2

(12) United States Patent
Bonetta et al.

(10) Patent No.: US 11,947,677 B2
(45) Date of Patent: Apr. 2, 2024

(54) DYNAMIC TAINT TRACKING IN ABSTRACT SYNTAX TREE INTERPRETERS

(71) Applicant: Oracle International Corporation, Redwood Shores, CA (US)

(72) Inventors: Daniele Bonetta, Amsterdam (NL); Alexander Jordan, Brisbane (AU); Christian Humer, Zurich (CH); Jacob Kreindl, Linz (AT)

(73) Assignee: Oracle International Corporation, Redwood Shores, CA (US)

( * ) Notice: Subject to any disclaimer, the term of this patent is extended or adjusted under 35 U.S.C. 154(b) by 219 days.

(21) Appl. No.: 17/011,637

(22) Filed: Sep. 3, 2020

(65) Prior Publication Data

US 2022/0067172 A1    Mar. 3, 2022

(51) Int. Cl.
*G06F 21/57*        (2013.01)
*G06F 8/41*         (2018.01)

(52) U.S. Cl.
CPC ............ *G06F 21/577* (2013.01); *G06F 8/427* (2013.01)

(58) Field of Classification Search
None
See application file for complete search history.

(56) References Cited

U.S. PATENT DOCUMENTS

| 8,543,683 | B2 * | 9/2013 | Kiciman | G06F 8/658 |
| | | | | 709/224 |
| 9,825,976 | B1 * | 11/2017 | Gomez | H04L 63/1416 |
| 9,940,479 | B2 * | 4/2018 | Ionescu | H04L 63/0227 |
| 10,581,879 | B1 * | 3/2020 | Paithane | G06F 21/566 |
| 10,904,291 | B1 * | 1/2021 | Naumann | H04L 63/20 |
| 2007/0169010 | A1 * | 7/2007 | Garner | G06F 8/10 |
| | | | | 717/136 |

(Continued)

FOREIGN PATENT DOCUMENTS

WO    WO-2017200942 A1 * 11/2017 .......... G06F 11/3604

OTHER PUBLICATIONS

M. R. Azadmanesh, M. L. Van De Vanter and M. Hauswirth, "Language-Independent Information Flow Tracking Engine for Program Comprehension Tools," 2017 IEEE/ACM 25th International Conference on Program Comprehension (ICPC), 2017, pp. 346-355, doi: 10.1109/ICPC.2017.5.*

(Continued)

*Primary Examiner* — Jeffrey Nickerson
*Assistant Examiner* — Vadim Savenkov
(74) *Attorney, Agent, or Firm* — Lathrop GPM LLP (57) ABSTRACT

A method may include determining that a non-constant value of a variable corresponding to a variable node of the abstract syntax tree flows into an operator node in the abstract syntax tree. The method may further include adding, to the abstract syntax tree, a check taint node including functionality to: make a taint status determination that the non-constant value is tainted, and return the non-constant value to the operator node. The operator node generates a result value by executing an operator using the non-constant value. The method may further include adding, to the abstract syntax tree, a set taint node that stores, based on the taint status determination, the result value in a second tainted object, and performing, using the abstract syntax tree, a taint analysis of the source code to identify a vulnerability in the source code.

19 Claims, 8 Drawing Sheets

(56) References Cited

U.S. PATENT DOCUMENTS

| | | | | |
|---|---|---|---|---|
| 2008/0083012 | A1* | 4/2008 | Yu | H04L 63/1483 726/1 |
| 2009/0138937 | A1* | 5/2009 | Erlingsson | H04L 63/1416 726/1 |
| 2009/0193497 | A1* | 7/2009 | Kikuchi | H04L 63/14 726/1 |
| 2011/0185271 | A1* | 7/2011 | Aciicmez | G06F 21/563 715/256 |
| 2013/0167129 | A1* | 6/2013 | Emani | G06F 8/45 717/151 |
| 2015/0020205 | A1* | 1/2015 | Wang | H04L 63/168 726/25 |
| 2015/0309813 | A1* | 10/2015 | Patel | G06F 8/75 703/22 |
| 2016/0094574 | A1* | 3/2016 | Hsueh | H04L 63/1416 726/23 |
| 2017/0331850 | A1* | 11/2017 | Li | G06F 11/3608 |
| 2018/0316715 | A1* | 11/2018 | Liu | H04L 63/1466 |
| 2019/0286763 | A1* | 9/2019 | Kastner | G06F 30/3312 |
| 2021/0318867 | A1* | 10/2021 | Oyamada | G06N 5/01 |

OTHER PUBLICATIONS

Jacob Kreindl, Daniele Bonetta, and Hanspeter Mössenböck. 2019. Towards efficient, multi-language dynamic taint analysis. In Proceedings of the 16th ACM SIGPLAN International Conference on Managed Programming Languages and Runtimes (MPLR 2019). https://doi.org/10.1145/3357390.3361028.*

G. Agosta, A. Barenghi, A. Parata and G. Pelosi, "Automated Security Analysis of Dynamic Web Applications through Symbolic Code Execution," 2012 Ninth International Conference on Information Technology—New Generations, 2012, pp. 189-194, doi: 10.1109/ITNG.2012.167.*

Haiyang Sun, Daniele Bonetta, Christian Humer, and Walter Binder. 2018. Efficient dynamic analysis for Node.js. In Proceedings of the 27th International Conference on Compiler Construction (CC 2018). Association for Computing Machinery, New York, NY, USA, 196-206. https://doi.org/10.1145/3178372.3179527.*

Michael Van De Vanter, Chris Seaton, Michael Haupt, Christian Humer, & Thomas Würthinger (2018). Fast, Flexible, Polyglot Instrumentation Support for Debuggers and other Tools. The Art, Science, and Engineering of Programming, 2(3).*

Bosman, E., Slowinska, A., Bos, H. (2011). Minemu: The World's Fastest Taint Tracker. In: Sommer, R., Balzarotti, D., Maier, G. (eds) Recent Advances in Intrusion Detection. RAID 2011. Lecture Notes in Computer Science, vol. 6961. Springer, Berlin, Heidelberg. https://doi.org/10.1007/978-3-642-23644-0_1.*

Jang, D., Jhala, R., Lerner, S., & Shacham, H. (2010). An Empirical Study of Privacy-Violating Information Flows in JavaScript Web Applications. In Proceedings of the 17th ACM Conference on Computer and Communications Security (pp. 270-283). Association for Computing Machinery.*

Wong, Wai Tuck. Dynamic Taint Analysis in JavaScript for JavaScript. Diss. Carnegie Mellon University, 2020.*

Bell, J., et al, "Phosphor: Illuminating Dynamic Data Flow in Commodity JVMs", ACM SIGPLAN Notices, Oct. 2014, 19 pages.

Christophe, L., et al., "Linvail: A General_Purpose Platform for Shadow Execution of JavaScript", Software Languages Lab, Vrije Universiteit Brussel, Brussels, Mar. 14, 2016, 11 pages.

Clause, J., et al., "Dytan: A Generic Dynamic Taint Analysis Framework", 2007 ACM International Symposium on Software Testing and Analysis, ISSTA'07, Jul. 9, 2007, 11 pages.

Conti, J. J., et al., "A Taint Mode for Python via a Library", In Nordic Conference on Secure IT Systems, Oct. 1, 2010, 13 pages.

Henderson, A., et al., "Make it Work, Make it Right, Make it Fast: Building a Platform-Neutral Whole-System Dynamic Binary Analysis Platform", In Proceedings of the 2014 International Symposium on Software Testing and Analysis, ISSTA 2014, Jul. 21-25, 2014, 11 pages.

Jensen, S. H., et al, "Type Analysis for JAVAScript", In Lecture Notes in Computer Science, vol. 5673 LNCS, Aug. 1, 2009, 18 pages.

Karim, R., et al., "Platform-Independent Dynamic Taint Analysis for JavaScript", IEEE Transactions on Software Engineering, Oct. 1, 2018, 17 pages.

Kashyap, V., et al, "JSAI: A Static Analysis Platform for JavaScript", Proceedings of the 22nd ACM SIGSOFT International Symposium on Foundations of Software Engineering, Nov. 16-22, 2014, 11 pages.

Lee., H., et al., "SAFE: Formal Specification and Implementation of a Scalable Analysis Framework for ECMAScript", International Workshop on Foundations of Object-Oriented Languages (FOOL), Oct. 22, 2012, 12 pages.

Park, D., et al., "KJS: A Complete Formal Semantics of JavaScript" IN Proceedings of the 36th ACM SIGPLAN Conference on Programming language Design and Implementation (PLDI'15), Jun. 1, 2015, 11 pages.

Perkins, J., et al., "Comprehensive Java Metadata Tracking for Attack Detection and Repair", Technical Report, Nov. 19, 2019, 12 pages.

Qin, F., et al, "LIFT: A Low-Overheard Practical Information Flow Tracking System for Detecting Security Attacks", In 2006 39th Annual IEEE/ACM International Symposium on Microarchitecture (MICRO'06), Dec. 9-13, 2006, 12 pages.

Sen, K., et al., "Jalangi: A Selective Record-Replay and Dynamic Analysis Framework for JavaScript", In 2013 9th Joint Meeting of the European Software Engineering Conference and the ACM SIGSOFT Symposium on the Foundations of Software Engineering ESEC/FSE 2013, Aug. 18-26, 2013, 11 pages.

* cited by examiner

DYNAMIC TAINT TRACKING IN ABSTRACT SYNTAX TREE INTERPRETERS

BACKGROUND

Taint analysis (also called "taint tracking") is a form of data flow analysis enabling the tracking of marked or "tainted" data throughout the execution of a program. Taint analysis is often used to detect vulnerabilities that may lead to injection attacks, where a program input, which may be controlled by a potential attacker, may reach a security sensitive function without proper checks or sanitization of the input. An injection vulnerability may, for example, lead to unauthorized access to a system (e.g., via remote code execution (RCE)), database (e.g., via Structured Query Language injection (SQLi)), or stealing of credentials from a user's browser (e.g., via cross-site scripting (XSS)). When taint analysis is performed at runtime, as opposed to statically, the taint analysis is referred to as dynamic taint analysis or dynamic taint tracking (e.g., because taint tracking may also be performed statically).

A virtual machine may support the execution of multiple programming languages (e.g., Java and other Java bytecode-based languages, dynamic languages such as JavaScript, Python, Ruby, R and bitcode-based languages such as WebAssembly). Programs written in the multiple programming languages may be converted to a common, language-independent representation called an abstract syntax tree. An abstract syntax tree is a tree representation of the structure of source code. Language runtimes in a virtual machine may be implemented using abstract syntax tree interpreters. Dynamic taint tracking is often performed at the binary level, and for dynamic programming languages, dynamic taint tracking is often performed at the level of source code rather than performing dynamic taint tracking at the level of abstract syntax trees and/or abstract syntax tree interpreters.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for instrumenting an abstract syntax tree including determining that a non-constant value of a variable corresponding to a variable node of the abstract syntax tree flows into an operator node in the abstract syntax tree. The abstract syntax tree is generated from source code. The method further includes adding, to the abstract syntax tree, a check taint node including functionality to: make a taint status determination that the non-constant value is tainted, and return the non-constant value to the operator node. The operator node generates a result value by executing an operator using the non-constant value. The method further includes adding, to the abstract syntax tree, a set taint node that stores, based on the taint status determination, the result value in a tainted object, and performing, using the abstract syntax tree, a taint analysis of the source code to identify a vulnerability in the source code.

In general, in one aspect, one or more embodiments relate to a system including a computer processor, a repository configured to store source code and an abstract syntax tree generated from the source code, and a taint propagation instrumenter, executing on the computer processor and configured to determine that a non-constant value of a variable corresponding to a variable node of the abstract syntax tree flows into an operator node in the abstract syntax tree, and add, to the abstract syntax tree, a check taint node including functionality to: make a taint status determination that the non-constant value is tainted, and return the non-constant value to the operator node. The operator node generates a result value by executing an operator using the non-constant value. The taint propagation instrumenter is further configured to add, to the abstract syntax tree, a set taint node that stores, based on the taint status determination, the result value in a tainted object, and perform, using the abstract syntax tree, a taint analysis of the source code to identify a vulnerability in the source code.

In general, in one aspect, one or more embodiments relate to a method for performing a taint analysis of source code including generating an abstract syntax tree for the source code, and sending the abstract syntax tree to a taint propagation instrumenter. The taint propagation instrumenter is configured to generate an instrumented abstract syntax tree by: determining that a non-constant value of a variable corresponding to a variable node of the abstract syntax tree flows into an operator node in the abstract syntax tree, and adding, to the abstract syntax tree, a check taint node including functionality to: make a taint status determination that the non-constant value is tainted, and return the non-constant value to the operator node. The operator node generates a result value by executing an operator using the non-constant value. The taint propagation instrumenter is further configured to generate the instrumented abstract syntax tree by adding, to the abstract syntax tree, a set taint node that stores, based on the taint status determination, the result value in a tainted object. The method further includes receiving, from the taint propagation instrumenter, the instrumented abstract syntax tree. The taint analysis is performed using the instrumented abstract syntax tree to identify a vulnerability in the source code.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to instrumenting an abstract syntax tree to perform taint tracking. An abstract syntax tree includes linguistic nodes and instrumentation nodes. The linguistic nodes represent syntactic constructs of source code. In contrast, the instrumentation nodes represent taint tracking actions to be performed at runtime by an abstract syntax tree interpreter. The instrumentation nodes include check taint nodes and set taint nodes. Check taint nodes detect the presence of tainted values. A tainted value may be an object that includes a taint status flag. Alternatively, a tainted value may be a tainted object that includes a primitive value (e.g., integer, Boolean, string, etc.). That is, the primitive value may be "boxed" by storing the primitive value in the tainted object. A check taint node may extract (e.g., "un-box") the primitive value from the tainted object and return the primitive value to an operator so that the taintedness of the primitive value is transparent to the operator. Set taint nodes may propagate the taintedness of an operator's input to an operator's output, where the output may be "re-boxed" into a tainted value. A taint analysis of the source code may be performed using the instrumented abstract syntax tree to identify a vulnerability in the source code. The reliability of the taint analysis may be enhanced due to performing taint propagation at the abstract syntax tree level because an abstract syntax tree encodes the syntax of the source code. In addition, the runtime efficiency of taint analysis may be enhanced by compiling (e.g., at runtime by a just-in-time (JIT) compiler) portions of the abstract syntax tree interpreter, resulting in efficient machine code in modern virtual machines.

Figure 1A:
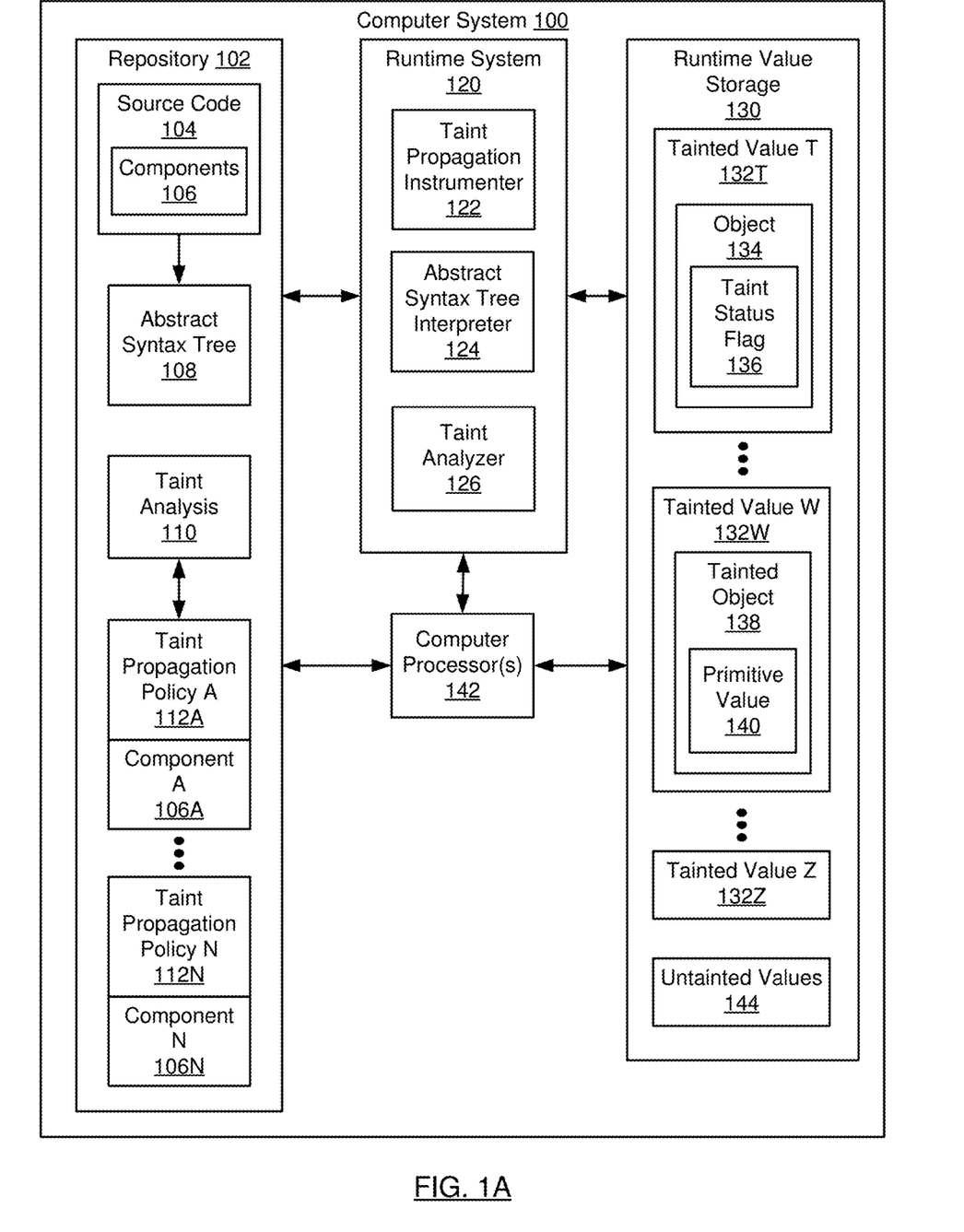
FIG. 1A and FIG. 1B show a system in accordance with one or more embodiments of the invention.

FIG. 1A shows a computer system (100) in accordance with one or more embodiments of the invention. As shown in FIG. 1, the computer system (100) includes a repository (102), a runtime system (120), runtime value storage (130), and computer processor(s) (142). In one or more embodiments, the computer system (100) takes the form of the computing system (500) described with respect to FIG. 5A and the accompanying description below or take the form of the client device (526) described with respect to FIG. 5B.

In one or more embodiments, the repository (102) is any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site. The repository (106) may be accessed online via a cloud service (e.g., Amazon Web Services, Egnyte, Azure, etc.).

In one or more embodiments, the repository (102) includes functionality to store source code (104), an abstract syntax tree (108), a taint analysis (110), and taint propagation policies (112A, 112N). The source code (104) is a collection of computer instructions (e.g., statements) written in a human-readable programming language, or intermediate representation (e.g., byte code). The source code (104) may include components (106). The components (106) are operators, expressions, statements, classes, methods, functions, interfaces, packages and/or other syntactic constructs within the source code (104). An abstract syntax tree (108) is a tree representation of the source code (104). For example, the abstract syntax tree (108) may be generated from the source code (104) by a compiler or a parser. The abstract syntax tree (108) is "abstract" in the sense that the abstract syntax tree (108) includes structural and/or content-related details of the source code (104) while omitting one or more syntactic details of the source code (104). For example, because grouping parentheses are implicit in the tree structure of the abstract syntax tree (108), the abstract syntax tree (108) may omit nodes corresponding to the grouping parentheses. The abstract syntax tree (108) may be executed by an abstract syntax tree interpreter (124).

Figure 1B:
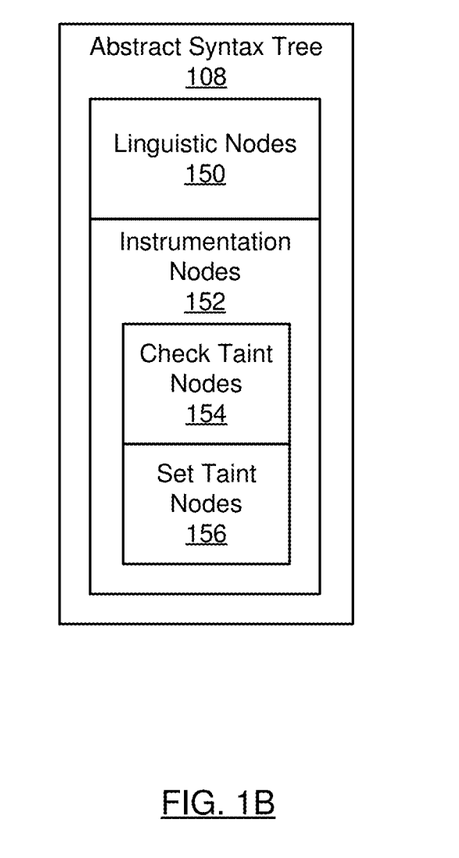

Turning to FIG. 1B, an abstract syntax tree (108) includes linguistic nodes (150) and instrumentation nodes (152). The linguistic nodes (150) represent syntactic constructs of the components (106) of the source code (104). For example, the linguistic nodes (150) may represent statements, variables, values, operators, functions, and any other syntactic constructs of a programming language (e.g., JavaScript). When a first programming language is implemented using a second programming language, the first programming language may be referred to as a "guest" programming language and the second programming language may be referred to as a "host" programming language. For example, if an interpreter for the JavaScript programming language is implemented via the Java programming language, then JavaScript is the guest programming language and Java is the host programming language. A linguistic node (150) may represent a built-in operator implemented in a host programming language (e.g., Java) used to implement the abstract syntax tree interpreter (124) for a guest programming language (e.g., JavaScript). For example, the built-in operator may be a library function (e.g., a square root function) implemented in the host programming language. An invocation of a built-in operator may be exposed to the abstract syntax tree interpreter (124) as a single executable linguistic node (150), where the abstract syntax tree interpreter (124) may recognize the invocation of the built-in operator as an executable entity (e.g., because the implementation of the built-in operator may be inaccessible to the abstract syntax tree interpreter (124)). In the remainder of this disclosure, the term "operator" may refer to an operator of the guest programming language (e.g., the JavaScript+operator) or a built-in function of the guest programming language (e.g., the JavaScript square root function).

In contrast, the instrumentation nodes (152) represent actions to be performed at runtime by the abstract syntax tree interpreter (124). The instrumentation nodes (152) may include check taint nodes (154) and set taint nodes (156). Check taint nodes (154) may detect the presence of tainted values (e.g., tainted values (132T, 132W, 132Z)). For example, a check taint node (154) may check whether a non-constant input value of an operator corresponding to a linguistic node (150) is tainted. For example, if the value of the variable is a constant value (e.g., a literal number or string), then the value would not be tainted. In contrast, set taint nodes (156) may propagate tainted status. For example, a set taint node (156) may propagate a tainted status from an input of an operator corresponding to a linguistic node (150) to an output of the operator.

Returning to FIG. 1A, in one or more embodiments, the taint analysis (110) is an analysis of the executed source code whose goal is to identify potential vulnerabilities (e.g., taint flows) in the source code (104). The taint analysis (110) may be performed by executing the abstract syntax tree (108) with additional logic for analysis. The taint analysis (110) may correspond to a taint configuration. The taint configuration may include program points (e.g., statements) in the source code (104) that contribute to a taint flow. For example, the taint configuration may include taint-sensitive operations, such as taint sources (e.g., where a potentially attacker-controllable input is received), taint sinks (e.g., where a security-sensitive operation, such as eval, is performed), and sanitizers. A sanitizer is a statement or function that transforms a potentially tainted value into a safe (e.g., trusted) value that is not associated with a taint flow. For example, a sanitizer may modify a value by encoding or replacing potentially dangerous characters with harmless equivalents. Continuing this example, the potentially dangerous characters may be filtered or escaped.

In one or more embodiments, the runtime value storage (130) includes functionality to store runtime values generated during the execution of the abstract syntax tree (108) (e.g., by the abstract syntax tree interpreter (124)). The runtime value storage (130) includes tainted values (132T, 132W, 132Z) and untainted values (144). The taint analysis (110) may include functionality to mark one or more runtime values as tainted values (132T, 132W, 132Z). In contrast, the untainted values (144) are "normal" values that are not marked as tainted. A tainted value (e.g., tainted value (132T)) may be an object (134) that includes a taint status flag (136). In one or more embodiments, the object (134) (e.g., a JavaScript object) is implemented using an object (e.g., a Java object) of the host programming language (e.g., Java) used to implement the abstract syntax tree interpreter (124). The taint status flag (136) may be an extra field that is added to an object (134) when the object (134) is marked as tainted.

In one or more embodiments, the object (134) further includes metadata (not shown) describing additional details about the tainted value (132T). The metadata may include a vulnerability category corresponding to the tainted value (132T). For example, the vulnerability category may be: Structured Query Language injection (SQLi), remote code execution (RCE), cross-site scripting (XSS), etc. Alternatively or additionally, the metadata may include a program point in the source code (104) corresponding to an origin of the object (134).

Alternatively, a tainted value (e.g., tainted value (132W)) may be a tainted object (138) that includes a primitive value (140). That is, the primitive value (140) may be "boxed" by storing the primitive value (140) in the tainted object (138), where the tainted object (138) functions as a container for the tainted primitive value (140). For example, in JavaScript, primitive values may include: integer, Boolean, string, float, long, double, short, etc. In one or more embodiments, the primitive value (140) is a primitive value of the host programming language used to implement the abstract syntax tree interpreter (124). For example, if the abstract syntax tree interpreter (124) is an interpreter for the JavaScript programming language written using Java as the host programming language, then the primitive value is a Java primitive value that lacks a corresponding JavaScript object. Continuing this example, the primitive value (140) may be boxed because it may not be possible to add a field (e.g., a taint status flag (136)) to the primitive value (140) without altering the semantics of the primitive value (140).

In one or more embodiments, taint propagation policies (112A, 112N) specify, for a taint analysis (110), the taint propagation behavior of components (106A, 106N) of the source code (104). A taint propagation policy (112A) may include one or more rules each specifying an input qualifier that determines when the taintedness of an input to the corresponding component (106A) is propagated to the output of the corresponding component (106A). For example, the input qualifier may be "any", indicating that the taintedness of any input to the corresponding component (106A) is propagated to the output of the corresponding component (106A). Alternatively, the input qualifier may be "none", indicating that the taintedness of any input to the corresponding component (106A) is not propagated to the output of the corresponding component (106A). Still alternatively, the input qualifier may be "this", indicating that only the taintedness of the "this" input object to the corresponding component (106A) is propagated to the output of the corresponding component (106A). In one or more embodiments, a taint propagation policy (112A) may be set via an application programming interface (API) whose inputs include the component (106A) and the input qualifier. For example, a taint propagation policy for the + operator, which may trigger string concatenation in JavaScript, may specify taint propagation with the input qualifier "any", while a taint propagation policy for the instanceof operator may specify taint propagation with the input qualifier "none". Continuing with the exemplary assumption that Java is the host language, a taint propagation policy for the built-in (e.g., JavaScript) concat function may specify taint propagation with the input qualifier "any", while a taint propagation policy for the built-in function startsWith may specify taint propagation with the input qualifier "none".

In one or more embodiments, a taint propagation policy (112A) may specify that the taintedness of an input value is not propagated to one or more specific output values. For example, a taint propagation policy (112A) may specify that the taintedness of an input value not be propagated to an output value that represents an error code. Continuing this example, when the output value is the error code "−1" or "undefined", then a taint propagation policy (112A) may specify that the taintedness of an input value is not propagated to the output value. That is, regardless of the taintedness of an input value, it may be impossible to taint the error code "−1" or "undefined".

Continuing with FIG. 1A, in one or more embodiments, the runtime system (120) includes a taint propagation instrumenter (122), an abstract syntax tree interpreter (124), and a taint analyzer (126). In one or more embodiments, the runtime system (120) is a virtual machine. A virtual machine is a software implementation of a computing device executing on an underlying computing device (e.g., computer system (100)). A virtual machine may abstract the operating system and hardware of the underlying computing device from instructions that are executed in the virtual machine.

The taint propagation instrumenter (122) includes functionality to add instrumentation nodes (152) to an abstract syntax tree (108) to detect the presence of tainted values and/or enforce taint propagation semantics (e.g., according to one or more taint propagation policies (112A, 112N)). The abstract syntax tree interpreter (124) includes functionality to execute an abstract syntax tree (108). The abstract syntax tree interpreter (124) may be implemented in a host language (e.g., Java) that is natively supported by the computer system (100). The taint analyzer (126) includes functionality to perform a taint analysis (110) during execution of an abstract syntax tree (108).

In one or more embodiments, the computer processor(s) (142) takes the form of the computer processor(s) (502) described with respect to FIG. 5A and the accompanying description below. In one or more embodiments, the computer processor (142) includes functionality to execute the taint propagation instrumenter (122), the abstract syntax tree interpreter (124), and/or the taint analyzer (126).

While FIG. 1A shows a configuration of components, other configurations may be used without departing from the scope of the invention. For example, various components may be combined to create a single component. As another example, the functionality performed by a single component may be performed by two or more components.

Figure 2:
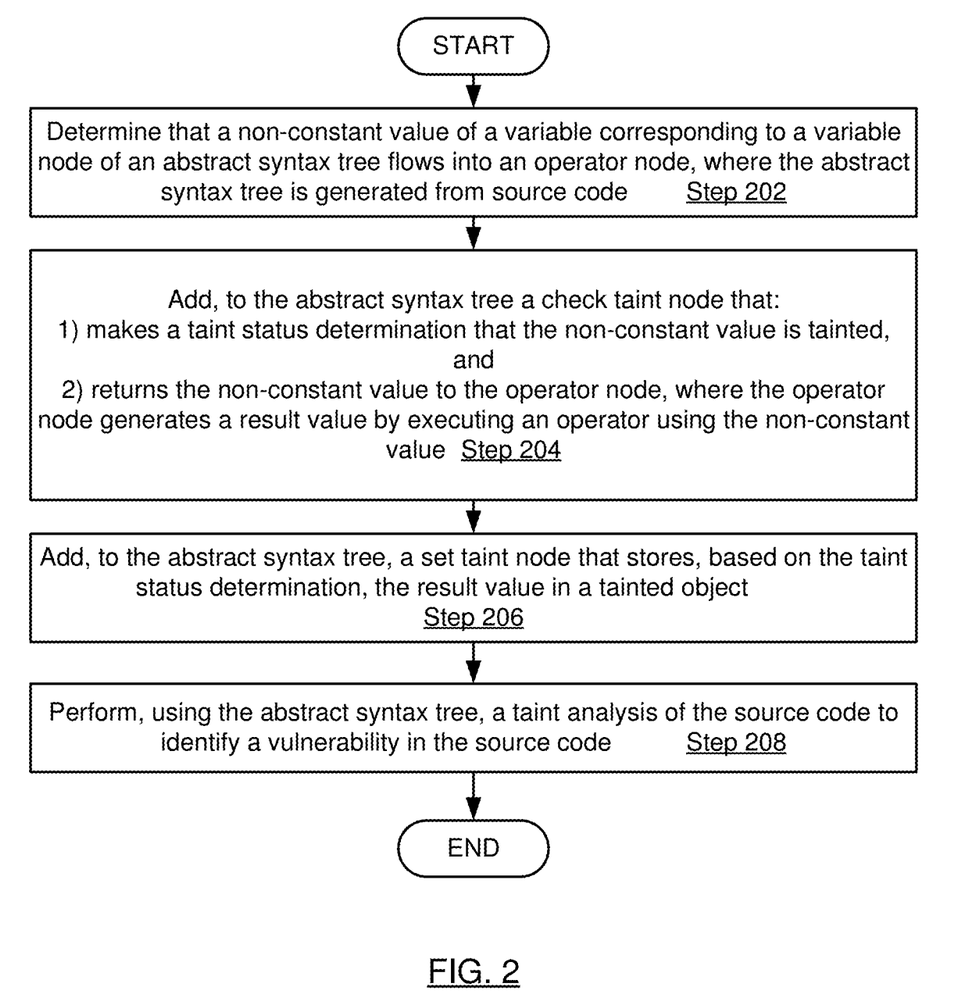
FIG. 2, FIG. 3A, and FIG. 3B show flowcharts in accordance with one or more embodiments of the invention.

FIG. 2 shows a flowchart in accordance with one or more embodiments of the invention. The flowchart depicts a process for instrumenting an abstract syntax tree. One or more of the steps in FIG. 2 may be performed by the components (e.g., the abstract syntax tree interpreter (124), the taint propagation instrumenter (122), and/or the taint analyzer (126) of the runtime system (120)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a non-constant value of a variable corresponding to a variable node of an abstract syntax tree is determined to flow into an operator node in the abstract syntax tree. For example, if the value of the variable is a constant value (e.g., a literal number or string), then the value would not be tainted. The abstract syntax tree is generated from source code. For example, the operator may be the + operator with two input variables. The taint propagation instrumenter may determine that the non-constant value of the variable is a primitive value (e.g., integer, Boolean, string) in a host programming language in which the abstract syntax tree interpreter is implemented. Alternatively, the taint propagation instrumenter may determine that the non-constant value of the variable is an object including a taint status flag indicating that the object is tainted.

In Step 204, a check taint node is added to the abstract syntax tree. The check taint node includes functionality to:
1) make a taint status determination that the non-constant value is tainted. For example, the taint status determination may be based on the non-constant value being a primitive value stored in a tainted object. As another example, the taint status determination may be based on the non-constant value being an object including a taint status flag indicating that the object is tainted; and
2) return the non-constant value to the operator node, where the operator node generates a result value by executing an operator using the non-constant value. The operator node may be a parent node of the variable node in the abstract syntax tree.

For example, if the check taint node makes a taint status determination that the non-constant value is a primitive value stored (e.g., boxed) in a tainted object, then the check taint node extracts the primitive value from the tainted object and returns the primitive value to operator node. By extracting the primitive value from the tainted object and returning the primitive value as input to the operator, the check taint node ensures that the taintedness of the primitive value is transparent (e.g., invisible) to the operator, because the operator accesses the primitive value rather than the tainted value. Furthermore, the operator may not be able to correctly process an input value that is a tainted object.

As another example, if the check taint node makes a taint status determination that the non-constant value is an object including a taint status flag indicating that the object is tainted, then the check taint node passes the object, without change, to the operator node. The taint status flag may be transparent to the operator. For example, the taint status flag may be stored in a "hidden" field of the object that is not accessed by the operator.

In one or more embodiments, the check taint node communicates the taint status determination performed in 1) above to the set taint node discussed in Step 206 below. For example, the check taint node may store the taint status determination in a variable that is accessible to the set taint node.

In one or more embodiments, the check taint node decides to perform taint propagation when a policy for the operator includes a rule whose input qualifier specifies that the taintedness of an input to the operator is propagated to the result of the operator. In other words, the check taint node may make the taint status determination when the policy for the operator includes a rule whose input qualifier specifies that the taintedness of an input to the operator is propagated to the result of the operator.

In one or more embodiments, the operator is a built-in operator implemented in the host language of the abstract syntax tree interpreter. For example, the built-in operator may be a library function (e.g., a square root function) implemented in the host programming language that implements the abstract syntax tree interpreter. An invocation of the built-in operator may be exposed to the abstract syntax tree interpreter as a single executable built-in operator node, so that the abstract syntax tree interpreter may recognize the invocation of the built-in operator as an executable entity. In one or more embodiments, when the operator is a built-in operator, the check taint node may un-box any inputs to the built-in operator that are primitive values stored in tainted objects, and then send the un-boxed primitive values to the built-in operator node (e.g., because the built-in operator may be unable to correctly handle instances of tainted objects). Then, the check taint node may invoke the built-in operator with all primitive values un-boxed.

In one or more embodiments, the taint propagation instrumenter observes that the non-constant values of the variable have been untainted during a series of executions of the abstract syntax tree. For example, the non-constant values of the variable during the series of executions may be stored in a repository. In response to observing that the non-constant values of the variable have been untainted during the series of executions of the abstract syntax tree, the taint propagation instrumenter may optimize the runtime performance of the abstract syntax tree based on an assumption that the non-constant values of the variable will continue to be untainted in future executions of the abstract syntax tree. That is, the taint propagation instrumenter may assume that performing a taint status determination for the non-constant value of the variable will be unnecessary. Thus, the taint propagation instrumenter may replace the check taint node with an empty instrumentation node that returns the non-constant value of the variable to the operator node without making a taint status determination. However, the assumption may be invalidated if after replacing the check taint node with the empty instrumentation node, the taint propagation instrumenter observes that the non-constant value of the variable is tainted during a new execution of the abstract syntax tree. In response to the invalidation of the assumption, the taint propagation instrumenter may replace the empty instrumentation node with the original check taint node.

In Step 206, a set taint node is added to the abstract syntax tree. The set taint node stores (e.g., re-boxes) the result value in a new tainted object based on the taint status determination performed by the check taint node. Thus, the set taint node propagates, to the result value of the operator, the taintedness of the input to the operator based on the taint status determination performed by the check taint node. In one or more embodiments, the set taint node propagates the taintedness of the input when a policy for the operator includes a rule whose input qualifier matches the input to the operator.

In one or more embodiments, when the operator is a built-in operator, the set taint node stores the result of invoking the built-in operator in a new tainted object (e.g., if indicated by a taint propagation policy for the built-in operator).

In one or more embodiments, executing an operator results in an implicit call to a function. For example, a type coercion rule may result in an implicit call to a built-in function to convert a value having one type to a converted value having a different type. Continuing this example, in JavaScript, concatenating a number with a string may result in an implicit call to the toString( ) function to convert the number to a string. The taint propagation instrumenter may further instrument the check taint node to perform the following (see description of Step 204 above):
1) detect the implicit call using the type coercion rule,
2) send, based on the taint status determination, the (un-boxed) non-constant value to the built-in function,
3) return the converted value generated by the built-in function to the operator node, and
4) convey the taint status determination performed by the check taint node to the set taint node.

In Step 208, a taint analysis of the source code is performed, executing the abstract syntax tree, to identify a vulnerability in the source code. For example, the vulnerability may be a Structured Query Language injection (SQLi), remote code execution (RCE), etc.

For example, the vulnerability in the source code may correspond to an object that includes the taint status flag indicating that the object is tainted. The object may include a vulnerability category and a program point in the source code corresponding to an origin of the object. For example, the abstract syntax tree interpreter may return, as a result of executing the abstract syntax tree, the vulnerability in the source code, the vulnerability category, and/or the program point in the source code corresponding to the origin of the object. Continuing this example, the result may be returned to a user (e.g., a security analyst) who initiated a taint analysis of the source code. Further continuing this example, the result may also include a program point in the source code corresponding to a security sensitive operator that receives the object as an input.

Figure 3A:
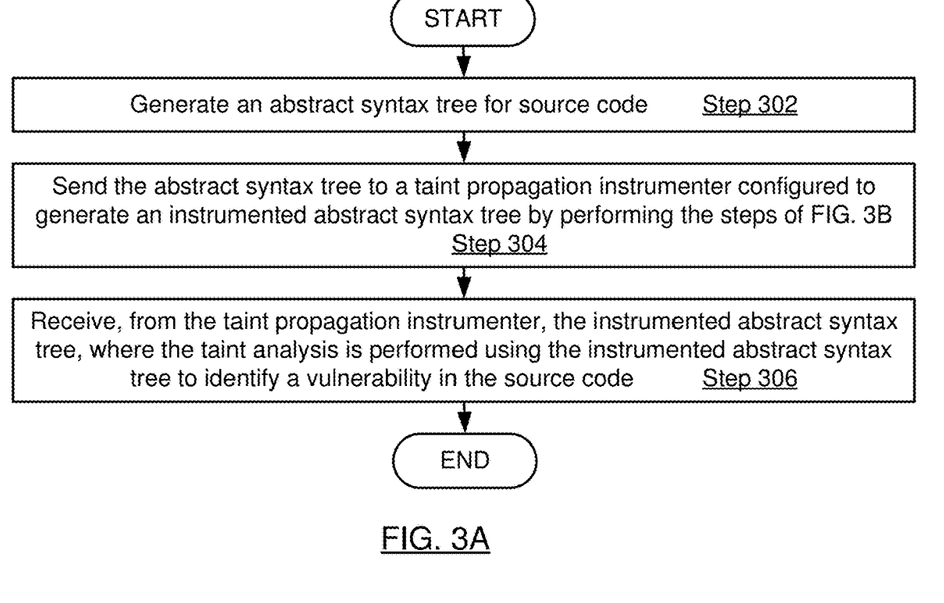

FIG. 3A shows a flowchart in accordance with one or more embodiments of the invention. The flowchart depicts a process for instrumenting an abstract syntax tree. One or more of the steps in FIG. 3A may be performed by the components (e.g., the abstract syntax tree interpreter (124), the taint propagation instrumenter (122), and/or the taint analyzer (126) of the runtime system (120)), discussed above in reference to FIG. 1A. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 302, an abstract syntax tree is generated for source code. The abstract syntax tree may be generated from the source code by a compiler or a parser.

Figure 3B:
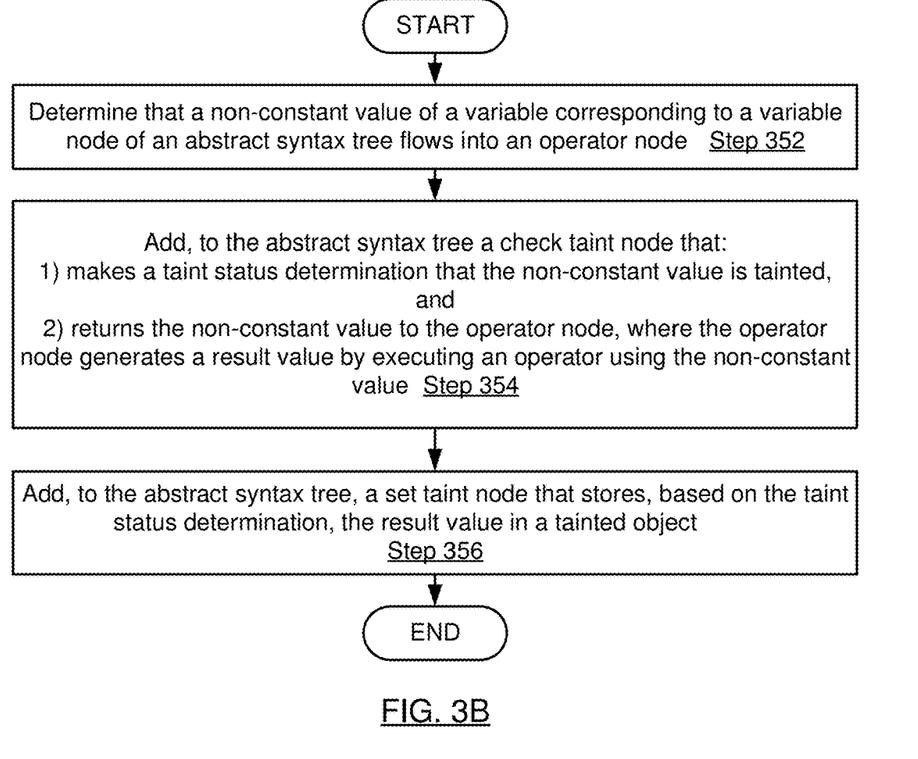

In Step 304, the abstract syntax tree is sent to a taint propagation instrumenter configured to generate an instrumented abstract syntax tree by performing the steps of FIG. 3B.

In Step 306, the instrumented abstract syntax tree is received from the taint propagation instrumenter. A taint analysis may then be performed using the instrumented abstract syntax tree to identify a vulnerability in the source code (see description of Step 208 above).

FIG. 3B shows a flowchart in accordance with one or more embodiments of the invention. The flowchart depicts a process for instrumenting an abstract syntax tree. One or more of the steps in FIG. 3B may be performed by the components (e.g., the abstract syntax tree interpreter (124), the taint propagation instrumenter (122), and/or the taint analyzer (126) of the runtime system (120)), discussed above in reference to FIG. 1A. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 352, a non-constant value of a variable corresponding to a variable node of an abstract syntax tree is determined to flow into an operator node in the abstract syntax tree (see description of Step 202 above).

In Step 354, a check taint node is added to the abstract syntax tree (see description of Step 204 above). The check taint node includes functionality to:
1) make a taint status determination that the non-constant value is tainted; and
2) return the non-constant value to the operator node, where the operator node generates a result value by executing an operator using the non-constant value.

In Step 356, a set taint node is added to the abstract syntax tree (see description of Step 206 above). The set taint node stores (e.g., re-boxes) the result value in a new tainted object based on the taint status determination performed by the check taint node.

Figure 4A:
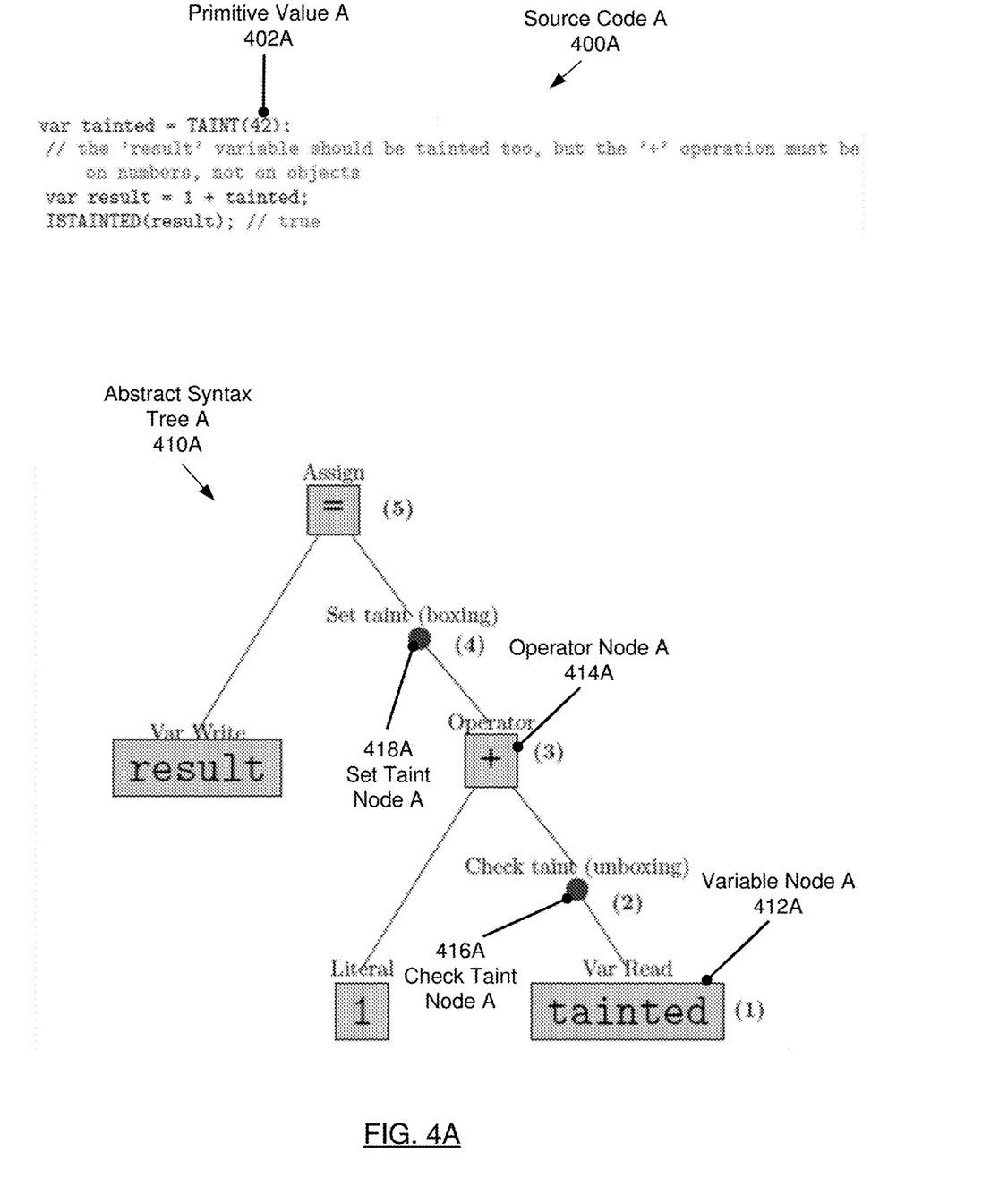
FIG. 4A, FIG. 4B, and FIG. 4C show examples in accordance with one or more embodiments of the invention.
Figure 4B:
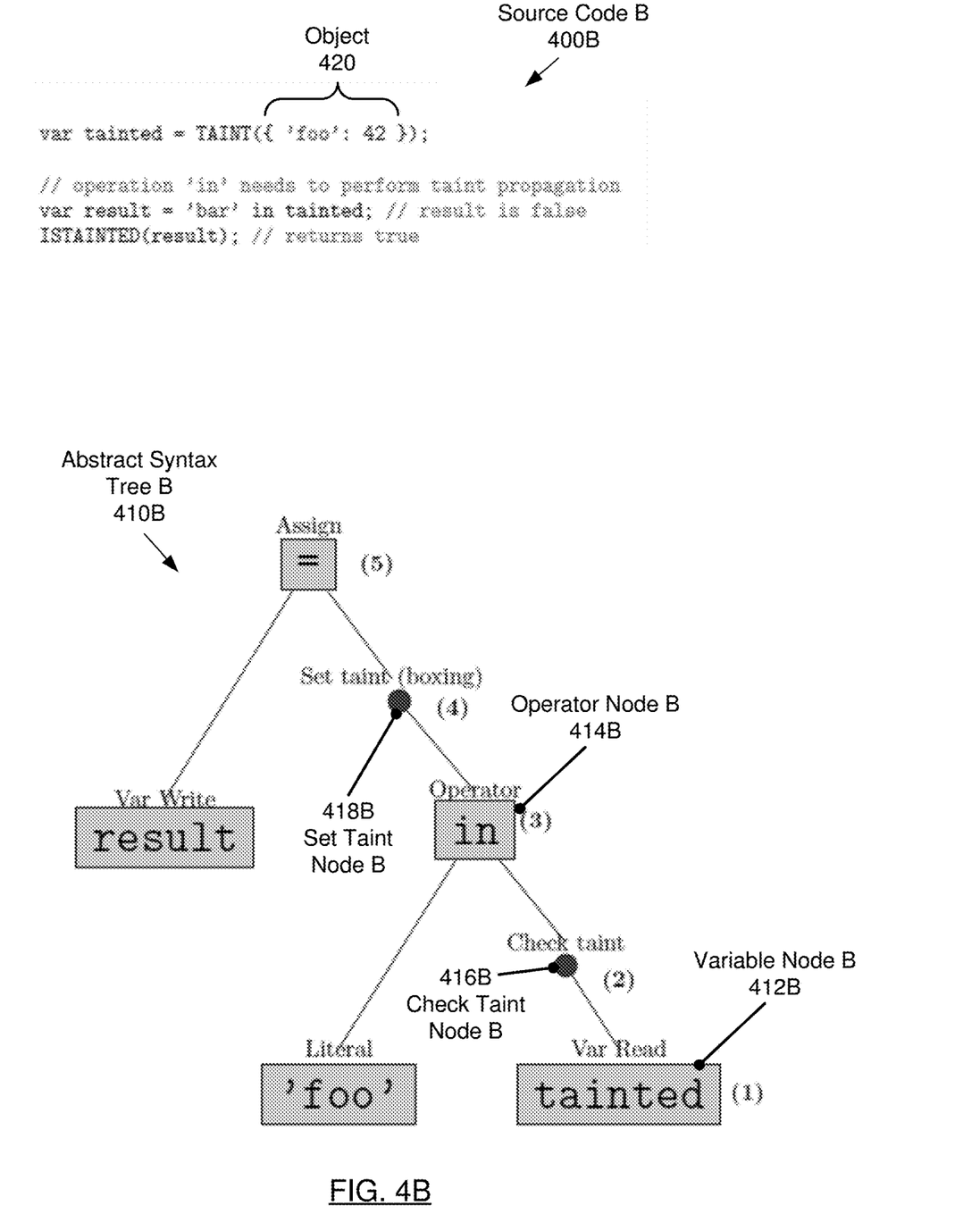
Figure 4C:
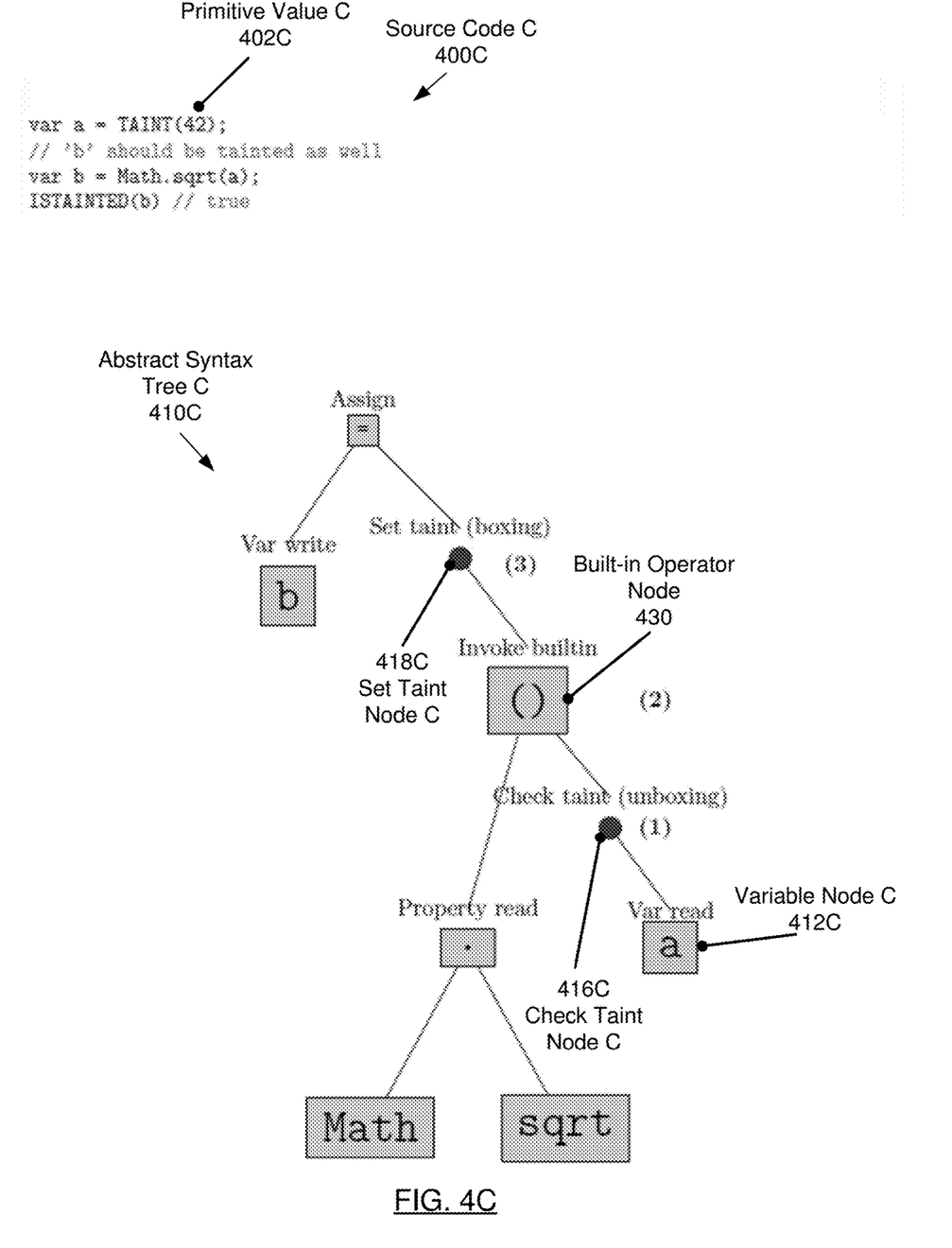

FIG. 4A, FIG. 4B, and FIG. 4C show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 4A shows source code (400A) ((104) in FIG. 1A) written in JavaScript and including a statement that assigns a tainted value to a variable. The tainted value includes a primitive value (402A) ((140) in FIG. 1A). The function TAINT stores (e.g., boxes) the primitive value (402A) in an instance of a TaintedObject (e.g., (138) in FIG. 1A). The Boolean function ISTAINTED may be used to check the taint status of any JavaScript value.

A parser generates an abstract syntax tree (410A) ((108) in FIG. 1A and FIG. 1B) for the source code (400A). Initially, the abstract syntax tree (410A) includes linguistic nodes, which include a variable node (412A) corresponding to the variable named tainted and an operator node (414A) corresponding to the + operator. The taint propagation instrumenter adds, to the abstract syntax tree (410A), instrumentation nodes: a check taint node (416A) ((154) in FIG. 1B) and a set taint node (418A) ((156) in FIG. 1B).

At runtime, the abstract syntax tree interpreter, which is written in Java, reads the value of the tainted variable, which corresponds to the variable node (412A). The value of the tainted variable is an instance of a TaintedObject. The check taint node (416A) makes a taint status determination that the value of the tainted variable is tainted based on the value being stored in a TaintedObject instance. The check taint node (416A) extracts (un-boxes) the primitive value from the TaintedObject instance and returns the primitive value to the operator node (414A). Thus, the check taint node (416A) insures that the + operator operates on a primitive value rather than on a TaintedObject instance. The result of applying the + operator to the primitive value is another primitive value. The set taint node (418A) stores (boxes) the primitive value resulting from applying the + operator in a new TaintedObject instance because the + operator propagates the taintedness of all input values, according to a taint propagation policy specified for the + operator. Finally, the new TaintedObject instance is stored in the variable named result.

FIG. 4B shows source code (400B) written in JavaScript and including a statement that assigns a tainted value to a variable. The tainted value includes an object (420) ((134) in FIG. 1A) (i.e., a JavaScript object). The function TAINT marks the object (420) as tainted by setting a taint status flag in the object (420).

A parser generates an abstract syntax tree (410B) for the source code (400B). Initially, the abstract syntax tree (410B) includes linguistic nodes, which include a variable node (412B) corresponding to the variable named tainted and an operator node (414B) corresponding to the in operator. The taint propagation instrumenter adds, to the abstract syntax tree (410B), instrumentation nodes: a check taint node (416B) and a set taint node (418B).

At runtime, the abstract syntax tree interpreter reads the value of the tainted variable, which corresponds to the variable node (412B). The value of the tainted variable is an object (420). The check taint node (416B) makes a taint status determination that the value of the tainted variable is tainted based on the object (420) including a taint status flag. The check taint node (416A) returns the object (420) to the operator node (414B)—the taint status flag is ignored by the in operator. The result of applying the in operator to the object (420) is a primitive value. The set taint node (418B) stores (boxes) the primitive value resulting from applying the in operator in a TaintedObject instance because the in operator propagates the taintedness of all input values, according to a taint propagation policy specified for the in operator. Finally, the TaintedObject instance is stored in the variable named result.

FIG. 4C shows source code (400C) written in JavaScript and including a statement that assigns a tainted value to a variable. The tainted value includes a primitive value (402C). The function TAINT stores (e.g., boxes) the primitive value (402C) in an instance of a TaintedObject.

A parser generates an abstract syntax tree (410C) for the source code (400C). Initially, the abstract syntax tree (410C) includes linguistic nodes, which include a variable node (412C) corresponding to the variable named a and a built-in operator node (430) corresponding to an invocation of a built-in operator, in this case a sqrt (square root) function in a Java math library. The taint propagation instrumenter adds, to the abstract syntax tree (410C), instrumentation nodes: a check taint node (416C) and a set taint node (418C).

At runtime, the abstract syntax tree interpreter reads the value of variable a, which corresponds to the variable node (412C). The value of variable a is an instance of a TaintedObject. The check taint node (416C) makes a taint status determination that the value of the variable a is tainted based on the value being stored in a TaintedObject instance. The check taint node (416C) extracts (un-boxes) the primitive value from the TaintedObject instance and returns the primitive value to the built-in operator node (430). Thus, the check taint node (416C) insures that the built-in sqrt function operates on a primitive value rather than on a TaintedObject instance. The result of applying the built-in sqrt function to the primitive value is another primitive value. The set taint node (418C) stores (boxes) the primitive value resulting from applying the built-in sqrt function in a new TaintedObject instance because the built-in sqrt function propagates the taintedness of all input values, according to a taint propagation policy specified for the built-in sqrt function. Finally, the new TaintedObject instance is stored in the variable named b.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
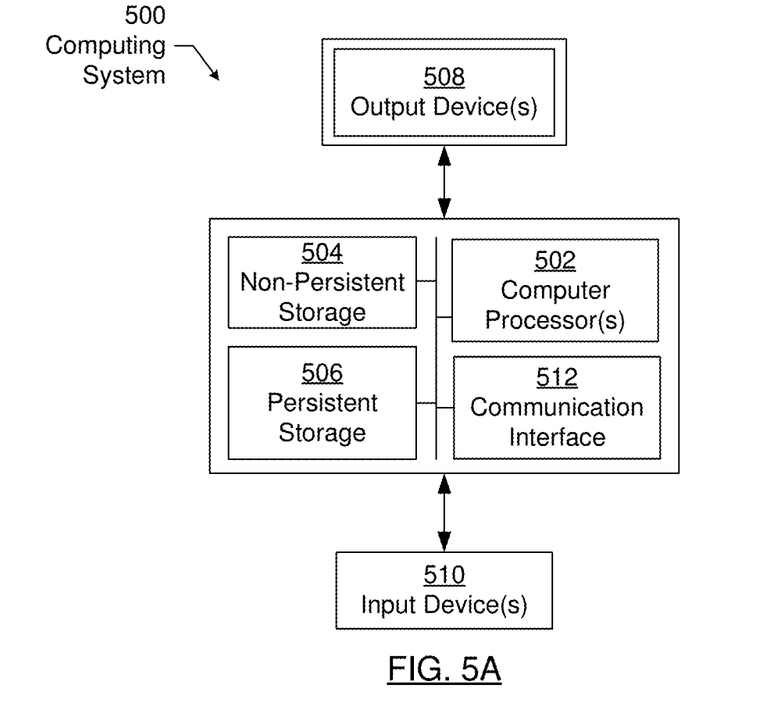
FIG. 5A and FIG. 5B show computing systems in accordance with one or more embodiments of the invention.
Figure 5B:
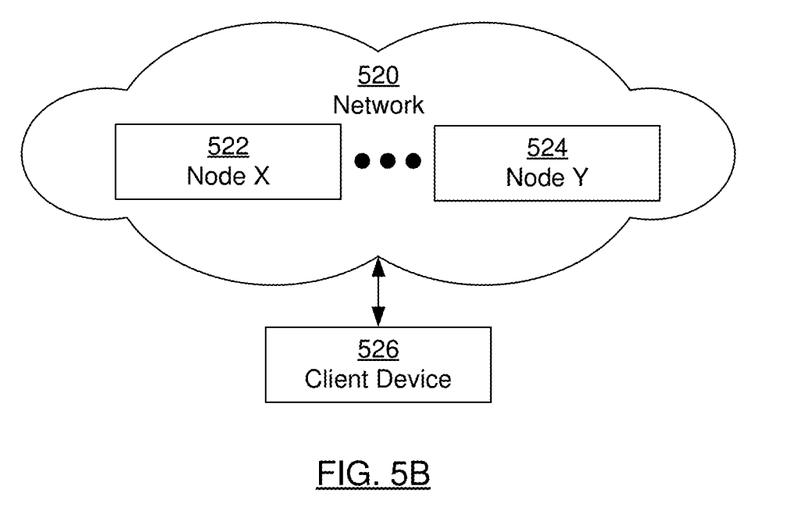

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   determining that a first non-constant value of a first variable corresponding to a first variable node of an abstract syntax tree flows into a first operator node in the abstract syntax tree, wherein the abstract syntax tree is generated from source code;
   adding, to the abstract syntax tree between the first variable node and the first operator node, a first check taint node comprising functionality to:
   make a first taint status determination that the first non-constant value is tainted,
   return the first non-constant value to the first operator node, wherein the first operator node generates a first result value by executing a first operator using the first non-constant value, and
   convey the first taint status determination to a first set taint node;
   adding, to the abstract syntax tree, the first set taint node between the first operator node and a parent node of the first operator node,
   wherein the first set taint node stores, based on the first taint status determination, the first result value in a first tainted object that identifies the first result value as tainted;
   executing the abstract syntax tree, wherein executing the abstract syntax tree comprises processing the first check taint node and the first set taint node; and
   while executing the abstract syntax tree, performing, using the abstract syntax tree, a taint analysis of the source code to identify a vulnerability in the source code.

2. The method of claim 1,
   wherein the first taint status determination is based on the first non-constant value being stored in a second tainted object, and
   wherein the first check taint node further comprises functionality to extract the first non-constant value from the second tainted object before returning the first non-constant value to the first operator node.

3. The method of claim 2,
   wherein the source code is represented in a first programming language,
   wherein the first operator node corresponds to an execution of a built-in operator implemented in a second programming language, and
   wherein the second programming language implements an interpreter for the first programming language.

4. The method of claim 1, wherein the first taint status determination is based on the first non-constant value being an object comprising a taint status flag indicating that the object is tainted.

5. The method of claim 1, wherein executing the abstract syntax tree comprises:
   making, by the first check taint node, a decision to perform taint propagation based on applying a policy for the first operator, wherein the policy comprises a rule that has an input qualifier specifying when, based on input to the first operator, to propagate a taint status of the inputs to results of the first operator.

6. The method of claim 1, further comprising:
   determining that a second non-constant value of a second variable corresponding to a second variable node in the abstract syntax tree flows into a second operator node in the abstract syntax tree, wherein the second non-constant value has a first type; and
   adding, to the abstract syntax tree, a second check taint node comprising functionality to:
   make a second taint status determination that the second non-constant value is tainted,
   detect an implicit call to a function to convert the second non-constant value to a second type,
   send the second non-constant value to the function, wherein the function generates a converted value having the second type using the second non-constant value, and
   return the converted value to the second operator node in the abstract syntax tree, wherein the second operator node generates a second result value by executing a second operator using the converted value.

7. The method of claim 1, further comprising:
   observing that non-constant values of a second variable have been untainted during a series of executions of the abstract syntax tree; and
   in response to observing that the non-constant values of the second variable have been untainted, replacing a second check taint node, added for the second variable, with an empty instrumentation node that returns a non-constant value of the first variable to the first operator node without making a taint status determination.

8. A system comprising:
   a hardware computer processor;
   a repository configured to store source code and an abstract syntax tree generated from the source code;
   a taint propagation instrumenter, executing on the hardware computer processor and configured to:
   determine that a first non-constant value of a first non-constant variable corresponding to a first variable node of the abstract syntax tree flows into a first operator node in the abstract syntax tree,
   add, to the abstract syntax tree between the first variable node and the first operator node, a first check taint node comprising functionality to:
   make a first taint status determination that the first non-constant value is tainted,
   return the first non-constant value to the first operator node, wherein the first operator node generates a first result value by executing a first operator using the first non-constant value, and
   convey the first taint status determination to a first set taint node, and
   add, to the abstract syntax tree, the first set taint node between the first operator node and a parent node of the first operator node,
   wherein the first set taint node stores based on the first taint status determination, the first result value in a first tainted object that identifies the first result value as tainted;

an abstract syntax tree interpreter, executing on the hardware computer processor and configured to execute the abstract syntax tree, wherein executing the abstract syntax tree comprises processing the first check taint node and the first set taint node; and a taint analyzer, executing on the hardware computer processor and configured to:
perform, while executing the abstract syntax tree and using the abstract syntax tree, a taint analysis of the source code to identify a vulnerability in the source code.

9. The system of claim 8,
wherein the first taint status determination is based on the first non-constant value being stored in a second tainted object, and
wherein the first check taint node further comprises functionality to extract the first non-constant value from the second tainted object before returning the first non-constant value to the first operator node.

10. The system of claim 9,
wherein the source code is represented in a first programming language,
wherein the first operator node corresponds to an execution of a built-in operator implemented in a second programming language, and
wherein the second programming language implements an interpreter for the first programming language.

11. The system of claim 8, wherein the first taint status determination is based on the first non-constant value being an object comprising a taint status flag indicating that the object is tainted.

12. The system of claim 8, wherein the taint propagation instrumenter is further configured to:
make a decision to perform the taint propagation based on applying a policy for the first operator, wherein the first check taint node makes the first taint status determination in response to the decision to perform the taint propagation.

13. The system of claim 8, wherein the taint propagation instrumenter is further configured to:
determine that a second non-constant value of a second variable corresponding to a second variable node in the abstract syntax tree flows into a second operator node in the abstract syntax tree, wherein the second non-constant value has a first type, and
add, to the abstract syntax tree, a second check taint node comprising functionality to:
make a second taint status determination that the second non-constant value is tainted,
detect an implicit call to a function to convert the second non-constant value to a second type,
send the second non-constant value to the function, wherein the function generates a converted value having the second type using the second non-constant value, and
return the converted value to the second operator node in the abstract syntax tree, wherein the second operator node generates a second result value by executing a second operator using the converted value.

14. The system of claim 8, wherein the taint propagation instrumenter is further configured to:
observe that non-constant values of a second variable have been untainted during a series of executions of the abstract syntax tree, and
in response to observing that the non-constant values of the second variable have been untainted, replace a second check taint node, added for the second variable, with an empty instrumentation node that returns a non-constant value of the first non-constant variable to the first operator node without making a taint status determination.

15. A non-transitory computer readable medium comprising computer readable program code for causing a computer system to perform operations comprising:
determining that a first non-constant value of a first variable corresponding to a first variable node of an abstract syntax tree flows into a first operator node in the abstract syntax tree, wherein the abstract syntax tree is generated from source code;
adding, to the abstract syntax tree between the first variable node and the first operator node, a first check taint node comprising functionality to:
make a first taint status determination that the first non-constant value is tainted,
return the first non-constant value to the first operator node, wherein the first operator node generates a first result value by executing a first operator using the first non-constant value, and
convey the first taint status determination to a first set taint node;
adding, to the abstract syntax tree, the first set taint node between the first operator node and a parent node of the first operator node,
wherein the first set taint node stores, based on the first taint status determination, the first result value in a first tainted object that identifies the first result value as tainted;
executing the abstract syntax tree, wherein executing the abstract syntax tree comprises processing the first check taint node and the first set taint node; and
while executing the abstract syntax tree, performing, using the abstract syntax tree, a taint analysis of the source code to identify a vulnerability in the source code.

16. The non-transitory computer readable medium of claim 15,
wherein the first taint status determination is based on the first non-constant value being stored in a second tainted object, and
wherein the first check taint node further comprises functionality to extract the first non-constant value from the second tainted object before returning the first non-constant value to the first operator node.

17. The non-transitory computer readable medium of claim 16,
wherein the source code is represented in a first programming language,
wherein the first operator node corresponds to an execution of a built-in operator implemented in a second programming language, and
wherein the second programming language implements an interpreter for the first programming language.

18. The non-transitory computer readable medium of claim 15, wherein executing the abstract syntax tree comprises:
making, by the first check taint node, a decision to perform taint propagation based on applying a policy for the first operator, wherein the policy comprises a rule that has an input qualifier specifying when, based on input to the first operator, to propagate a taint status of the inputs to results of the first operator.

19. The non-transitory computer readable medium of claim 15, the operations further comprising:

observing that non-constant values of a second variable have been untainted during a series of executions of the abstract syntax tree; and in response to observing that the non-constant values of the second variable have been untainted, replacing a second check taint node, added for the second variable, with an empty instrumentation node that returns a non-constant value of the first variable to the first operator node without making a taint status determination.

* * * * *